United States Patent [19]
Ritchie

[11] Patent Number: 5,857,732
[45] Date of Patent: Jan. 12, 1999

[54] PLASTIC MODULAR DOOR FOR A VEHICLE

[75] Inventor: Jack J. Ritchie, Washington, Mich.

[73] Assignee: The Budd Company, Troy, Mich.

[21] Appl. No.: 604,586

[22] Filed: Feb. 21, 1996

[51] Int. Cl.⁶ ...................................................... B60J 5/04
[52] U.S. Cl. .................................. 296/146.5; 296/146.2; 296/146.11; 296/901; 49/502
[58] Field of Search ............................. 296/146.5, 146.6, 296/146.2, 146.7, 146.11, 901; 49/502

[56] References Cited

U.S. PATENT DOCUMENTS

| | | | |
|---|---|---|---|
| 2,197,950 | 4/1940 | Schwenk | 296/901 X |
| 2,438,185 | 3/1948 | Prance | 296/901 X |
| 4,115,974 | 9/1978 | Purcell | 296/901 X |
| 4,306,381 | 12/1981 | Presto . | |
| 4,328,642 | 5/1982 | Presto . | |
| 4,529,244 | 7/1985 | Zaydel | 296/901 X |
| 4,785,585 | 11/1988 | Grier et al. . | |
| 4,800,638 | 1/1989 | Herringshaw et al. . | |
| 4,827,671 | 5/1989 | Herringshaw . | |
| 4,831,710 | 5/1989 | Katoh et al. | 296/146.5 X |
| 4,843,762 | 7/1989 | Grier et al. . | |
| 4,845,894 | 7/1989 | Herringshaw et al. . | |
| 4,911,876 | 3/1990 | Freeman . | |
| 4,945,682 | 8/1990 | Alrman et al. | 296/146.5 X |
| 4,949,508 | 8/1990 | Elton | 296/146.7 X |
| 5,000,990 | 3/1991 | Freeman . | |
| 5,273,606 | 12/1993 | Greve et al. . | |
| 5,325,632 | 7/1994 | Djavairian et al. . | |
| 5,536,060 | 7/1996 | Rashid et al. | 296/146.5 X |

FOREIGN PATENT DOCUMENTS

| | | | |
|---|---|---|---|
| 1923943 | 11/1970 | Germany | 296/901 |
| 1627 | 1/1987 | Japan | 296/901 |

*Primary Examiner*—Joseph D. Pape
*Attorney, Agent, or Firm*—Harness, Dickey & Pierce, P.L.C.

[57] ABSTRACT

In accordance with the teachings of the present invention, a vehicle door including fiber reinforced plastic (FRP) members is provided. The vehicle door includes a fiber reinforced plastic outer skin member which is adhesively bonded to a fiber reinforced plastic intermediate shell including lateral side walls cooperating with inner and outer faces to define an open box-like structure with a hollow, interior cavity. The adhesively bonded outer skin member and intermediate shell define a door subassembly to which a hinge mechanism is coupled for securement to a body of a partially assembled vehicle. The door subassembly and the body of the partially assembled vehicle are simultaneously painted during the on-line assembly process. A carrier plate assembly, including a window glass and regulator mechanism for controlling vertical movement of the window glass, is mountable to the inner face of the intermediate shell after the application of the paint to the door subassembly and the body of the partially assembled vehicle. A metal intrusion beam may be affixed to the outer face of the intermediate shell prior to bonding the outer skin member to the intermediate shell.

13 Claims, 4 Drawing Sheets

PLASTIC MODULAR DOOR FOR A VEHICLE

BACKGROUND OF THE INVENTION

1. Technical Field

This invention relates to vehicles and, more particularly, to plastic modular doors for land vehicles.

2. Discussion

Modular door assemblies for land vehicles are generally known in the art. Such modular door assemblies typically include inner and outer panels that are fixed together to form a hollow shell structure in which the door's piece of window glass and associated hardware components are located. The hardware components typically include a window regulator unit, a locking mechanism, and other electrical and mechanical assemblies required for a particular door application. Unfortunately, these hardware components are commonly inserted through relatively small access openings in the inner panel and attached thereto during the on-line assembly process. Often, this is an awkward process to be performed during the on-line assembly process.

It is known to form the outer panel of a door for a land vehicle from a plastic material due to its light weight characteristics. Unfortunately, the use of this type of outer panel also typically requires some type of inner panel structure made from metal, such as steel or the like, to provide structural support and rigidity to the door. This approach leads to problems of attaching the metal inner panel to the plastic outer panel as well as other on-line assembly problems. Additionally, the use of a totally metal inner panel structure increases the overall weight of the door and the vehicle to which it is ultimately attached.

It is therefore desirable to provide a modular door for a land vehicle that minimizes the use of metal structures while exhibiting high rigidity and strength characteristics.

More particularly, it is desirable to provide a modular door for a land vehicle including a plastic outer skin member as well as a plastic intermediate shell that are adhesively bonded to one another to form a door subassembly in order to reduce the weight of the door as well as the overall weight of the vehicle to which it is attached.

It is further desirable to provide a modular door including the above-referenced door subassembly that is secured to the body of a partially assembled vehicle for simultaneous application of paint to the door subassembly and the body during the on-line assembly process.

Yet, it is also desirable to provide a carrier plate assembly that carries a piece of window glass and associated door hardware components that may be assembled off-line and mechanically attached to the door subassembly after the application of the paint during the on-line assembly process.

SUMMARY OF THE INVENTION

In accordance with the teachings of the present invention, a plastic vehicle door and method for assembling the same to a body of a partially assembled vehicle is disclosed. While the present invention will be described in connection with the use of fiber reinforced plastic (FRP) materials, it will be understood that other plastic or lightweight non-metallic materials having sufficient strength characteristics may be used.

In accordance with the teachings of one embodiment of the present invention, a vehicle door includes a fiber reinforced plastic outer skin member to which a fiber reinforced plastic intermediate shell is bonded with an adhesive to define a door subassembly. The intermediate shell includes lateral side walls cooperating with inner and outer faces to define an open box-like structure with a hollow, interior cavity. A hinge mechanism is coupled to the door subassembly for securing the door subassembly to a body of a partially assembled vehicle for the simultaneous application of paint to the door subassembly and the body during the on-line assembly process.

In accordance with a preferred embodiment, the vehicle door includes a metal intrusion beam affixed to the intermediate shell prior to adhesively bonding the outer skin member to the intermediate shell.

In accordance with another preferred embodiment, the vehicle door includes a carrier plate assembly mountable to the inner face of the intermediate shell after the application of the paint to the door subassembly and the body of the partially assembled vehicle. A plurality of metal reinforcing plates are affixed to or embedded within the inner face of the intermediate shell to which the carrier plate assembly is mounted. The carrier plate assembly includes a piece of window glass slideably mounted to the carrier plate assembly and a window regulator means for controlling vertical movement of the piece of window glass about the carrier plate assembly.

BRIEF DESCRIPTION OF THE DRAWINGS

The various advantages of the present invention will become apparent to those skilled in the art after reading the following specifications and by reference to the drawings in which.

DETAILED DESCRIPTION OF THE PREFERRED EMBODIMENTS

The following description of the preferred embodiments is merely exemplary in nature and is in no way intended to limit the invention or its application or uses.

The present invention is particularly concerned with providing a modular door for a land vehicle that requires minimal metal structures in order to reduce the weight of the door while retaining high strength characteristics. The invention provides a plastic modular door and method of assembling the same to a body of a partially assembled vehicle in order to substantially eliminate on-line assembly process problems, including but not limited to paint and build problems, that are associated with prior hybrid plastic/metal modular door designs.

Figure 1:
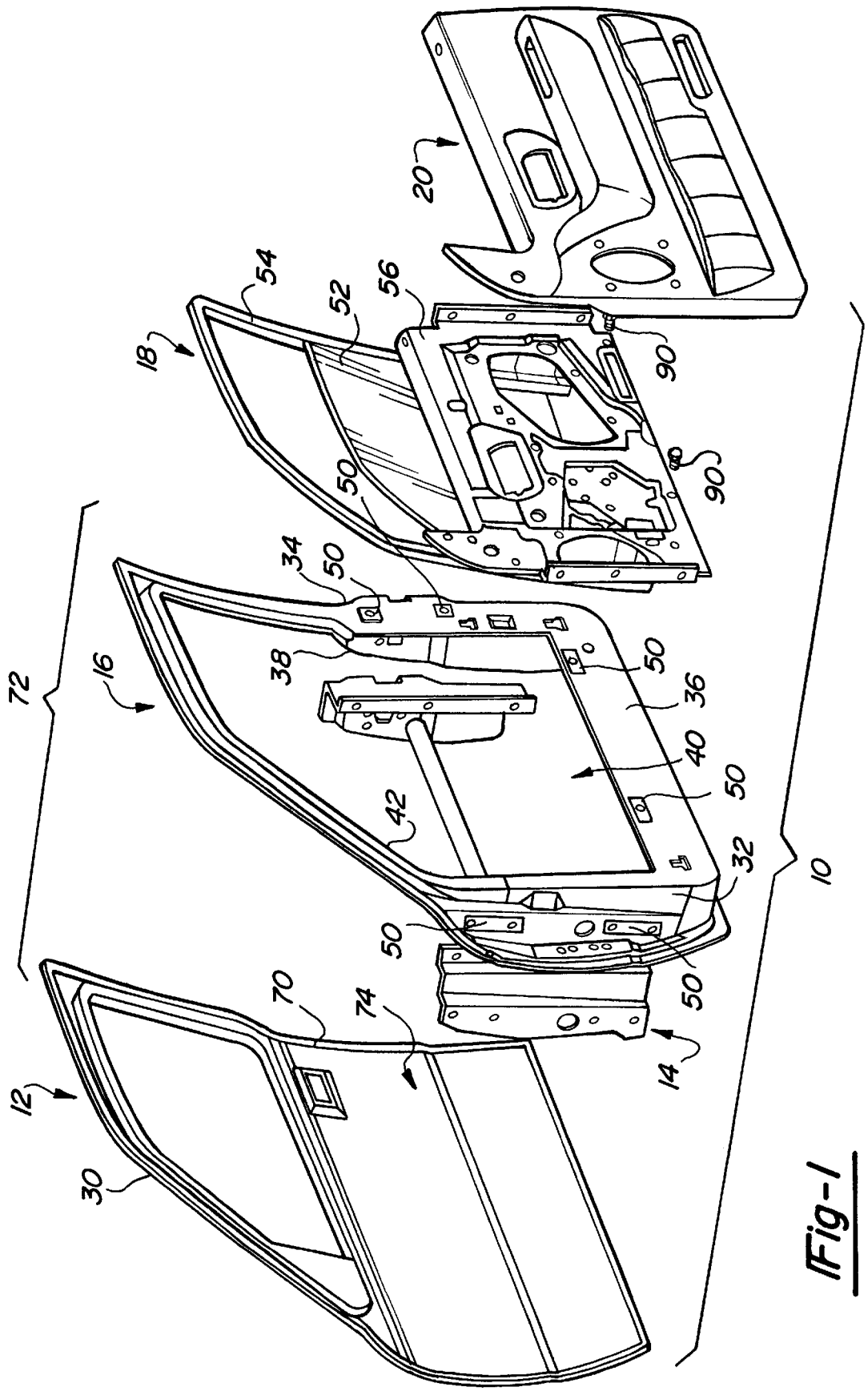
FIG. 1 is an exploded perspective view of a vehicle door made in accordance with the teachings of the present invention.

Referring to FIG. 1 a modular door 10 for a land vehicle is shown including five main parts: a fiber reinforced plastic outer skin member 12, a metal intrusion beam 14, a fiber reinforced plastic intermediate shell 16, a carrier plate assembly 18, and an interior trim member 20. The outer skin member 12 and the intermediate shell 16 are formed from fiber reinforced plastic materials in order to reduce the weight of the door 10 as well as a vehicle to which it will ultimately be attached. Both the outer skin member 12 and the intermediate shell 16 can be manufactured in accordance with a vacuum compression molding technique wherein a suitable charge of sheet molding compound (SMC) is formed in a mold under vacuum as disclosed in commonly assigned U.S. Pat. No. 5,130,071 to Iseler et al and U.S. Pat. No. 5,370,521 to McDougall, which are hereby incorporated by reference. Alternatively, the outer skin member 12 and the intermediate shell 16 can be manufactured in accordance with the resin transfer molding techniques disclosed in commonly assigned U.S. Pat. Nos. 4,849,147 and 5,000,990 both to Freeman, which are hereby incorporated by reference. Generally, a fiber reinforced plastic structure is made in accordance with the resin transfer molding techniques by applying preforms to a hollow, thin-walled support which has been preshaped to the general configuration of the structure. The support is then depressurized and the support/preform subassembly is placed into a mold. The mold is closed and the support is again pressurized. Then, resin is injected into the mold to impregnate the fibrous pieces of the preforms. Once the resin cures, the mold is opened and the part is removed.

In accordance with the embodiment shown in FIG. 1, the outer skin member 12 includes a window frame portion 30 including an aperture defining a window. The intermediate shell 16 includes lateral side walls 32 and 34 as well as an inner face 36 and an outer face 38. The lateral side wall 32 and 34 cooperate with the inner face 36 and the outer face 38 to define an open box-like structure with a hollow, interior cavity 40. The intermediate shell 16 further includes a window frame portion 42 generally corresponding to the shape of the window frame portion 30 of the outer skin member 12. It should be noted that the present invention is not limited to a door having a window portion but rather could include a continuous skin member and a corresponding intermediate shell both being devoid of window frame portions.

Figure 2:
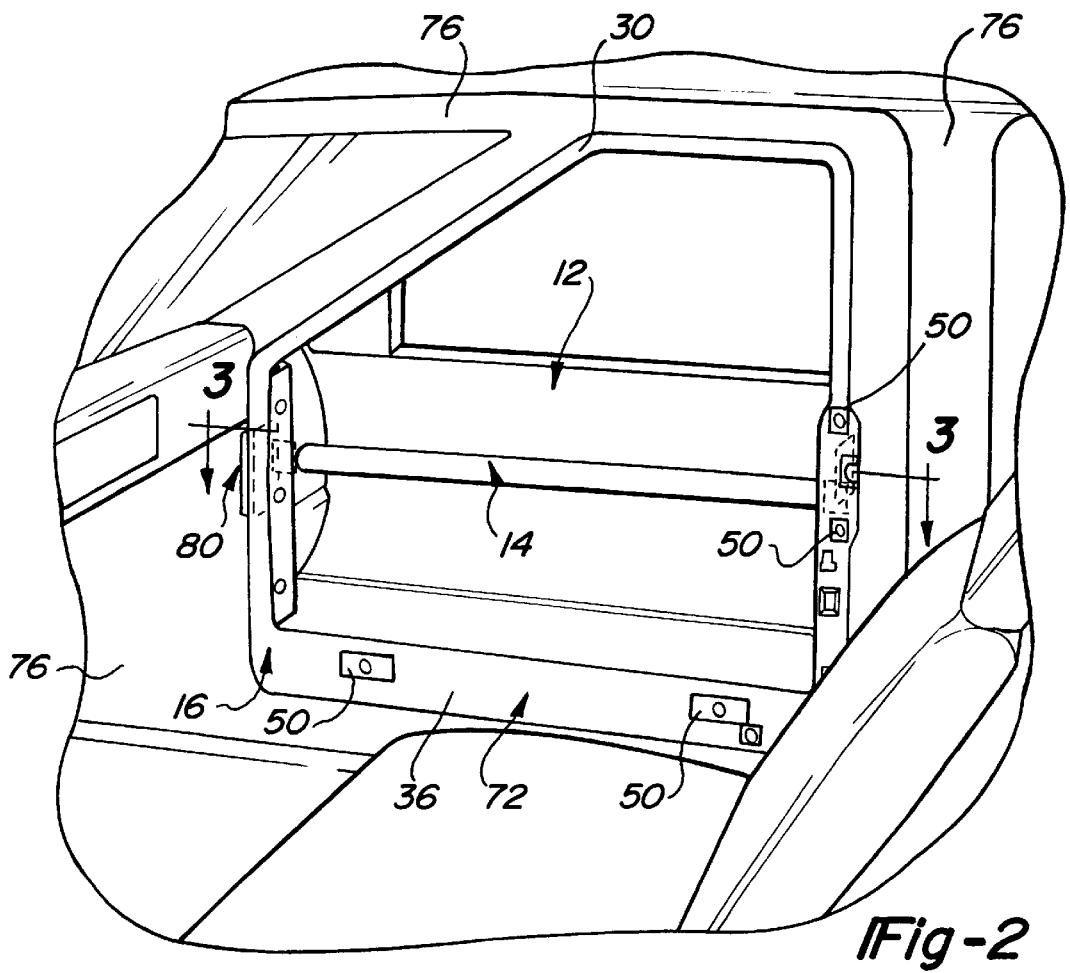
FIG. 2 is an interior cut away view of the door subassembly secured to a body of a partially assembled vehicle during the on-line assembly process for simultaneous application of paint in accordance with the present invention.
Figure 3:
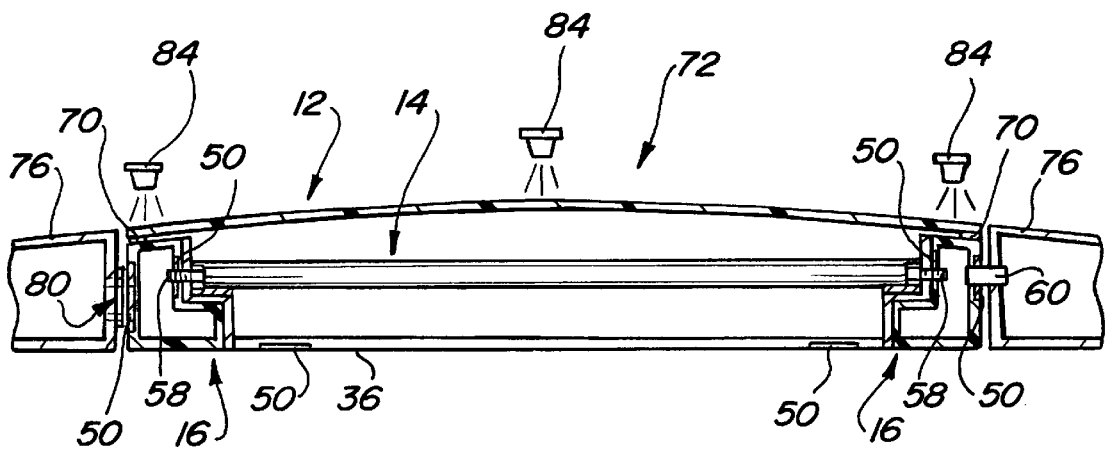
FIG. 3 is a view, along line 3—3 of FIG. 2, of the door subassembly secured to the body of the partially assembled vehicle in accordance with the present invention.

As best illustrated in FIGS. 1–3, the intermediate shell 16 includes a plurality of metal reinforcing plates 50 that are affixed to or embedded within the lateral side walls 32 and 34, the inner face 36, and the outer face 38 of the intermediate shell 16. The metal reinforcing plates 50 are positioned throughout the intermediate shell 16 for providing structural stability and rigidity to the door 10 while minimizing the use of metal components.

In accordance with a preferred embodiment, the metal reinforcing plates 50 are embedded within the intermediate shell 16 through the use of the resin transfer molding technique disclosed in the above-referenced U.S. Pat. No. 4,849,147 to Freeman. Generally, in accordance with the resin transfer molding technique, a metal structure, such as the metal reinforcing plates 50, are attached to a piece of fibrous material into which a resin is injected. The resin is then cured to form a molded structure with the metal structure lying on an outer surface thereof. After removal from the mold, the metal structure can be used to attach external components to the molded structure.

The carrier plate assembly 18 includes a piece of window glass 52 which is slideably mounted to a metal window track member 54 which, in turn, is secured to a hardware module 56. The hardware module 56 is preferably made of metal, such as galvanized steel or like rigid materials, and is configured to contain and operably support door hardware components typically associated with currently available land vehicles. These hardware components may include a window regulator unit for controlling the vertical movement of the piece of window glass 52 about the window track member 54. Additionally, the hardware module 56 may contain a locking mechanism 60 as well as other electrical and mechanical assemblies required for a particular door application. As will be discussed in detail below, the carrier plate assembly 18 is a separate, independent unit which may be assembled and tested at a remote off-line location and thereafter be attached to the intermediate shell 16 at a desired point during the on-line assembly process of the vehicle. This enables the elimination of hardware from the on-line location and/or relocation of the hardware to the off-line location.

The interior trim member 20 has a shape generally corresponding to the carrier plate assembly 18 so as to substantially cover the carrier plate assembly 18 and provide a cosmetic appearance for door 10.

In accordance with a preferred embodiment, as best illustrated in FIG. 3, after the outer skin member 12 and the intermediate shell 16 have been formed or molded in accordance with the above-described techniques, the metal intrusion beam 14 is secured or affixed to the outer face 38 of the intermediate shell 16 via a plurality of fasteners 58, or any other type of suitable mechanical attachment members. Preferably, the metal intrusion beam 14 is connected to the intermediate shell 16 such that the fasteners 58 extend through the metal reinforcing plates 50.

Next, a bead uncured adhesive 70 is applied to an inner surface 74 of the outer skin member 12 for bonding with the intermediate shell 16 to define a door subassembly 72. It should be noted that the door subassembly 72 may be formed without the inclusion of metal intrusion beam 14. Preferably, the outer skin member 12 is adhesively bonded to the intermediate shell 16 through the use of a hot and cool air bonding apparatus and method disclosed in commonly assigned U.S. patent application Ser. No. 08/379,873, filed Jan. 27, 1995, titled "HOT AND COOL AIR BONDING APPARATUS AND METHOD", which is hereby incorporated by reference. In accordance with the use of hot and cool air bonding apparatus and method, the uncured adhesive 70 is applied to the inner surface 74 of the outer skin member 12. Thereafter, the outer skin member 12 and the intermediate shell 16 are supported in two nest members with the adhesive 70 contacting the intermediate shell 16. Heated air is then blown about portions of the outer skin member 12 and the intermediate shell 16 such that the adhesive 70 located therebetween is heated above its curing temperature. Thereafter, cooler temperature air is blown about the same portions of the outer skin member 12 and the intermediate shell 16 in order to quickly cool the resulting door subassembly 72 which can then be removed from the nest members. The use of the hot and cool air bonding apparatus and method improves the resulting surface qualities of and provides uniform bonding strength throughout the resulting door subassembly 72. The use of the bead of adhesive 70 provides the resulting door subassembly 72 with a single molded sealed surface which, in turn, improves the durability of the door 10. Furthermore, since the outer skin 12 and shell 16 are both made of plastic, the adhesive bond strength and reliability may be greater than when adhesively bonding a plastic outer skin to a metal inner panel.

Turning to FIG. 2, the door subassembly 72 is illustrated mounted to a partially assembled body 76 of a land vehicle. A hinge mechanism 80 is attached to the door subassembly 72 through a metal reinforcing plate 50 embedded in side wall 32. The hinge mechanism 80 is used to secure the door subassembly 72 to the body 76 during the on-line assembly process.

With reference to FIG. 3, a view along line 3—3 of FIG. 2 is shown. This view illustrates a plurality of paint application mechanisms 84 that simultaneously apply paint to the door subassembly 72 as well as the body 76 of the partially assembled vehicle during the on-line assembly process. The ability to paint the door subassembly 72 simultaneously with the body 76 of the vehicle eliminates paint matching problems that existed with prior modular door designs.

Figure 4:
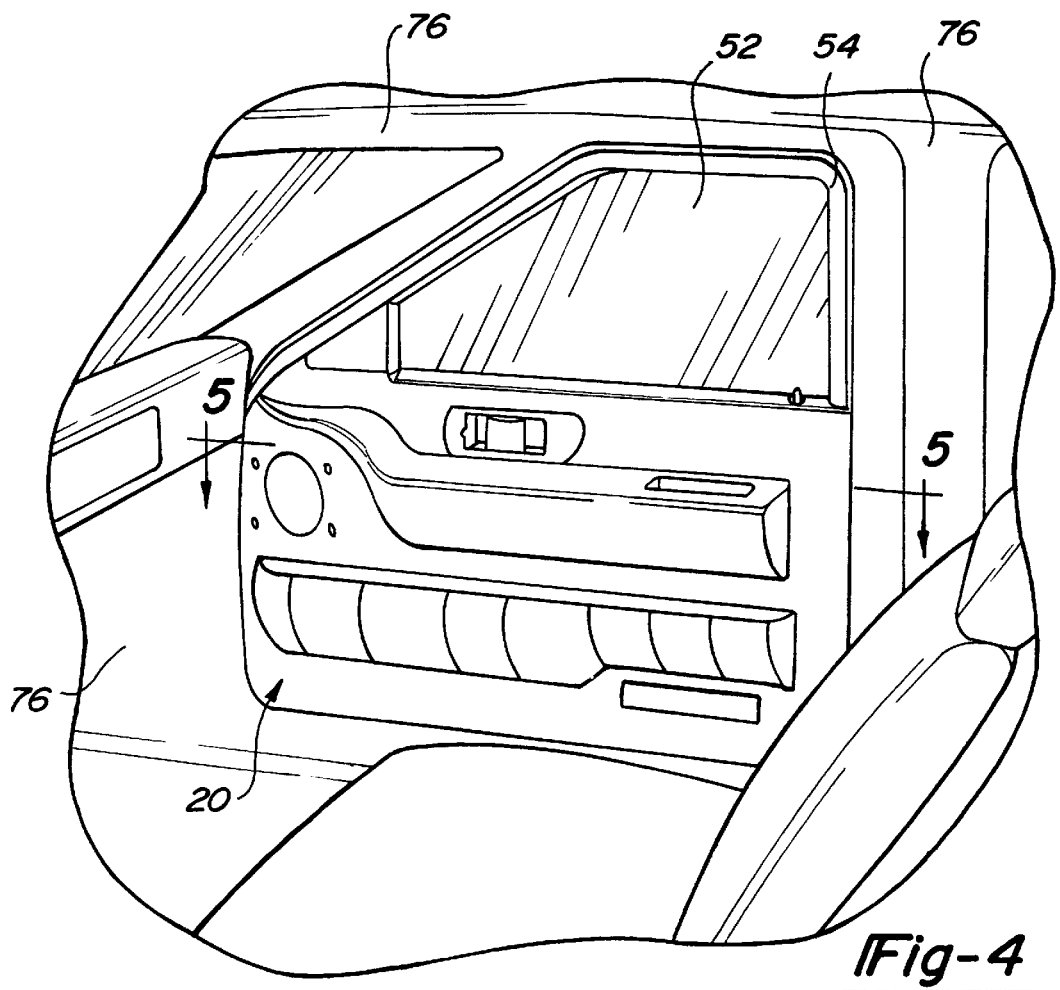
FIG. 4 is an interior cut away view of the vehicle door after a carrier plate assembly and an interior trim member have been attached to the door in accordance with the present invention.
Figure 5:
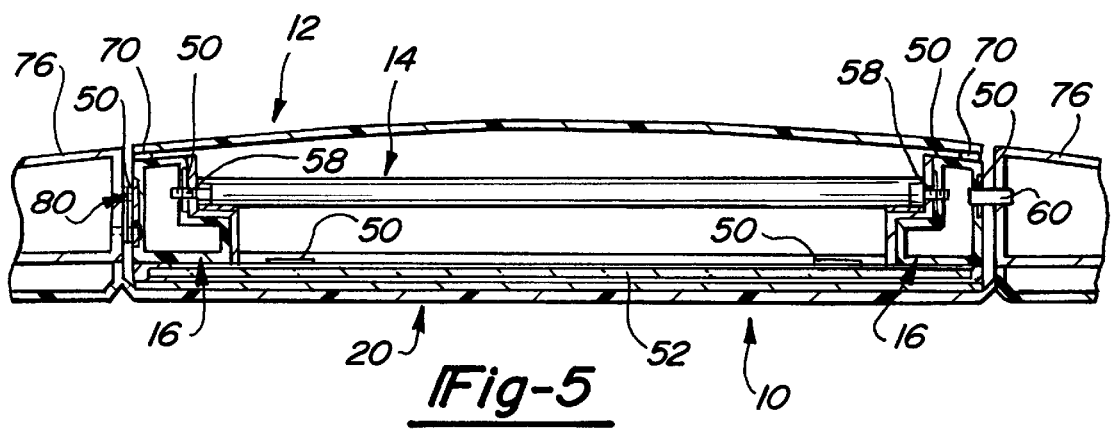
FIG. 5 is a view, along line 5—5 of FIG. 4, of the vehicle door in accordance with the present invention.

After the paint has been applied to the door subassembly 72 as well as the body 76 of the partially assembled vehicle, the carrier plate assembly 18 is mechanically attached to the inner face 36 of the intermediate shell 16. As best illustrated in FIGS. 1 and 5, fasteners 90 extend through the carrier plate assembly 18 and the metal reinforcement plates 50 embedded in the inner face 36 of the intermediate shell 16. The use of the carrier plate assembly 18 provides flexibility during the assembly process in that the door 10 may be assembled at different points during the on-line assembly process, with carrier assembly 18 being attached to the door subassembly 72 after the on-line painting process is completed. In addition, the metal window track member 54 is nested into the window track portion of shell 16 to provide this portion of the otherwise plastic door with needed structural rigidity. With reference to FIGS. 4 and 5, the interior trim member 20 is attached to the carrier plate assembly 18 to complete the assembly process of the vehicle door 10. The interior trim member 20 may be mechanically or adhesively attached to the carrier plate assembly 18.

Figure 6:
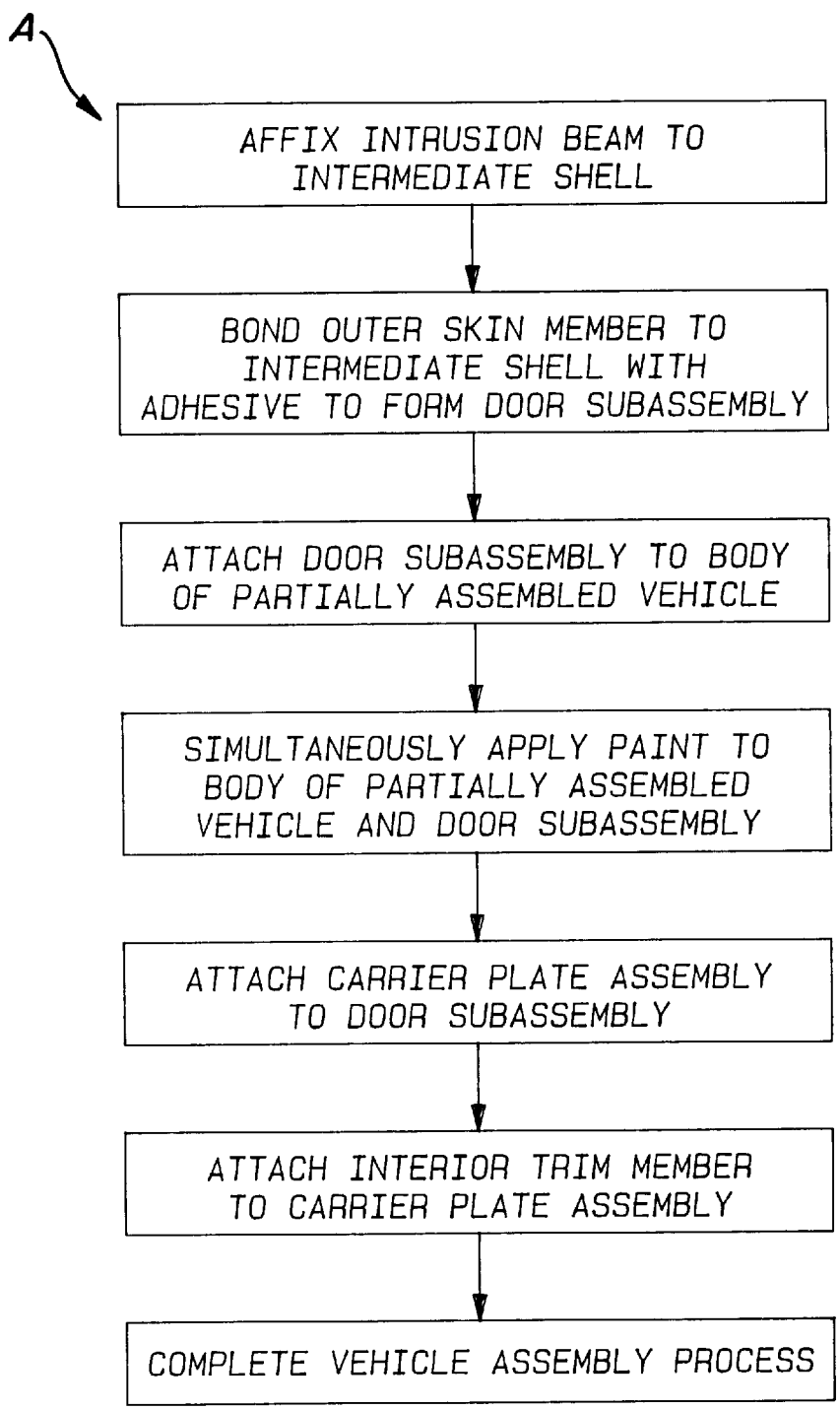
FIG. 6 is a flow chart illustrating the general steps carried out in making the vehicle door in accordance with the present invention.

Lastly, turning to FIG. 6, a flow chart outlining the general steps carried out in making the vehicle door 10 is designated as reference letter A. In accordance with a preferred embodiment, the method of assembling the modular door 10 to the body 76 of the partially assembled vehicle includes the following general steps. First, the intrusion beam 14 is affixed to the intermediate shell 16. Thereafter, the outer skin member 12 is adhesively bonded to the intermediate shell 16 to form the door subassembly 72. The door subassembly 72 is thereafter attached to the body 76 of the partially assembled vehicle during the on-line assembly process. Paint is simultaneously applied to the body 76 of the partially assembled vehicle and the door subassembly 72. As the vehicle continues the on-line assembly process, the carrier plate assembly 18 is mechanically attached to the door subassembly 72 with fasteners 90. Lastly, the interior trim member 20 is attached to the carrier plate assembly 18 in order to provide a cosmetic appearance for the door 10 as viewed from within the completed vehicle. Lastly, the vehicle assembly process is continued and completed.

From the foregoing, it can be seen that compared to prior art modular doors for land vehicles, the modular door 10 has reduced weight and uses minimal metal structures while retaining high rigidity and strength characteristics. An additional advantage is that the intermediate shell 16, being made of plastic, does not require corrosion-resistant coatings that are often required of metal inner panels. Further, the modular door 10 simplifies the on-line assembly process while eliminating paint matching problems with the vehicle to which the door 10 is attached.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention as defined by the following claims.

What is claimed is:

1. A vehicle door, comprising:
   a fiber reinforced plastic outer skin member;
   a fiber reinforced plastic intermediate shell including lateral side walls cooperating with inner and outer faces to define an open box-like structure with a hollow, interior cavity;
   the outer face of the intermediate shell being bonded to the outer skin member with an adhesive to define a door subassembly;
   a carrier plate assembly for supporting hardware components, the carrier plate assembly being attached to the intermediate shell;
   an interior trim panel member being connected to the door subassembly and displaced from the outer skin member by the intermediate shell; and
   hinge means, coupled to the door subassembly, for securing the door subassembly to a body of a partially assembled vehicle, whereby paint is simultaneously applied to the subassembly and the body of the partially assembled vehicle.

2. The vehicle door of claim 1, further comprising:
   a metal intrusion beam affixed to the intermediate shell prior to bonding the outer skin member to the intermediate shell.

3. The vehicle door of claim 2, wherein the metal intrusion beam extends longitudinally across the interior cavity of the intermediate shell.

4. The vehicle door of claim 1, further comprising:
   a plurality of metal reinforced members secured to the intermediate shell for providing structural reinforcement for the vehicle door.

5. The vehicle door of claim 1, further comprising:
   means for mounting the carrier plate assembly to the inner face of the intermediate shell.

6. The vehicle door of claim 5, wherein the carrier plate assembly further includes:
   a window glass slidably mounted to the carrier plate assembly;
   a window regulator means for controlling vertical movement of the window glass about the carrier plate assembly; and
   a metal window frame portion nested into a corresponding window frame portion in the intermediate shell to thereby provide structural integrity thereto.

7. The vehicle door of claim 5, wherein the means for mounting the carrier plate assembly includes a plurality of mechanical mounting means for mechanically attaching the carrier plate assembly to the intermediate shell.

8. The vehicle door of claim 7, wherein the mechanical mounting means includes a plurality of fasteners extending through metal reinforcement members secured to the intermediate shell.

9. The vehicle door of claim 5,
   wherein the interior trim member substantially covers the carrier plate assembly and includes
   means for mounting the interior trim member to the carrier plate assembly.

10. The vehicle door of claim 1 wherein the outer skin member includes a first aperture defining a window and wherein the intermediate shell includes a second aperture at least as large as the first aperture.

11. A vehicle door, comprising:

a fiber reinforced plastic intermediate shell including lateral side walls cooperating with inner and outer faces to define an open box-like structure with a hollow, interior cavity;

a metal intrusion beam extending longitudinally across the interior cavity of the intermediate shell and affixed to first metal reinforcing plates affixed to an outer face of the intermediate shell;

a fiber reinforced plastic outer skin member being adhesively bonded to the intermediate shell to define a door subassembly;

an interior trim member being connected to the door subassembly and displaced from the outer skin member by the intermediate shell;

second metal reinforcing plates affixed to at least one of the side walls; and hinge means, mounted to the second metal reinforcing means, for securing the door subassembly to a body of a partially assembled vehicle, whereby paint is simultaneously applied to the door subassembly and the body of the partially assembled vehicle.

12. The vehicle door of claim 11, further comprising:

third metal reinforcing plates affixed to the inner face of the intermediate shell;

a carrier plate assembly mounted to the third metal reinforcing plates after the application of the paint to the door subassembly and the body of the partially assembled vehicle;

a plurality of fasteners extending through the carrier plate assembly and the third metal reinforcing plates for mounting the carrier plate assembly to the door subassembly;

the interior trim member substantially covering the carrier plate assembly; and means for mounting the interior trim member to the carrier plate assembly.

13. The vehicle door of claim 12 wherein the carrier plate assembly further includes a metal window frame portion nested in a corresponding window frame portion in the intermediate shell.

* * * * *